Aug. 22, 1939.     N. S. BORCH     2,170,258
METHOD AND APPARATUS FOR HANDLING POWDERED MATERIAL
Filed Aug. 26, 1937
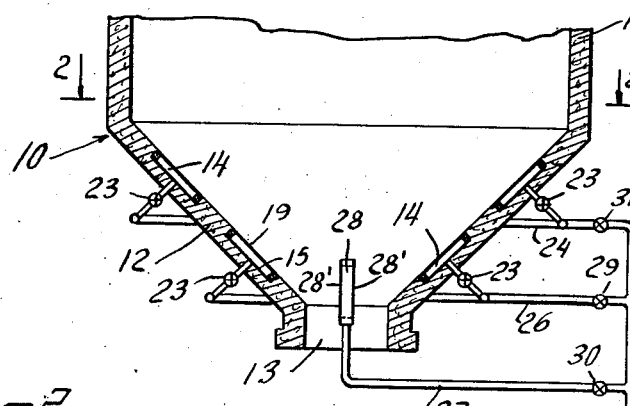
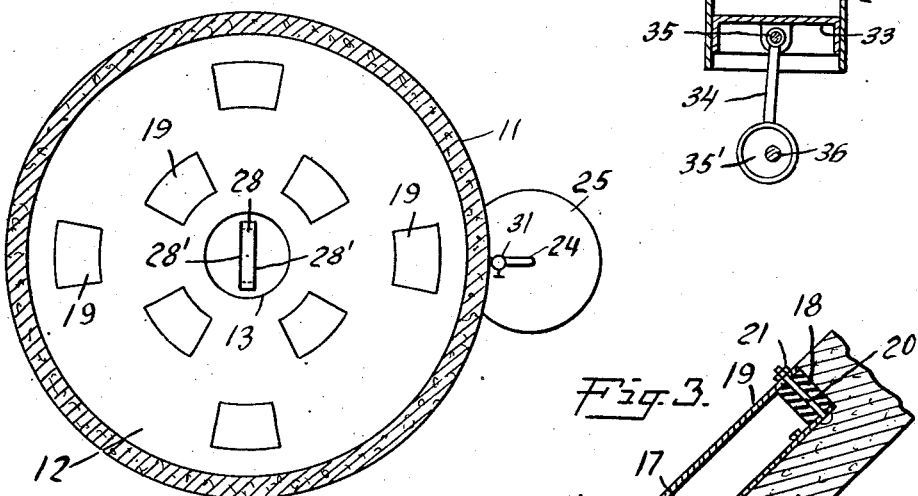
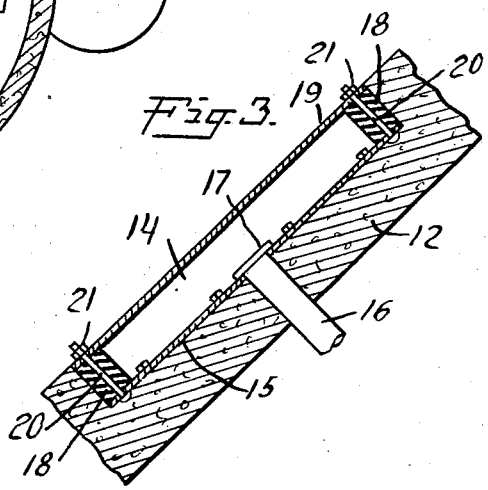
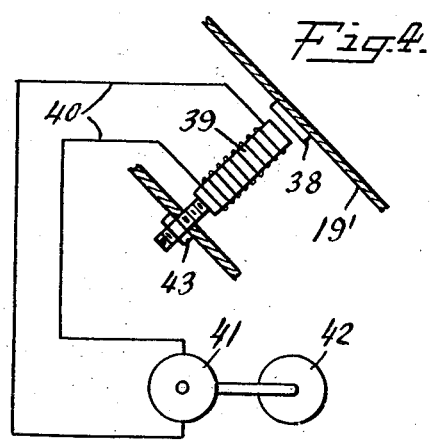
INVENTOR
Niels Sofus Borch
BY
Pennie Davis Marvin & Edmonds
ATTORNEYS Patented Aug. 22, 1939

2,170,258

UNITED STATES PATENT OFFICE 2,170,258

METHOD AND APPARATUS FOR HANDLING POWDERED MATERIAL

Niels Sofus Borch, Copenhagen, Denmark, assignor to F. L. Smidth & Company, New York, N. Y., a corporation of New Jersey Application August 26, 1937, Serial No. 160,954
In Great Britain August 27, 1936

2 Claims. (Cl. 221—124)

This invention relates to apparatus for handling powdered material and is concerned more particularly with a novel method of storing and discharging powdered material expeditiously and a new apparatus by which that method can be practiced. The new apparatus is simple in construction and reliable in operation and is adapted for manufacture at low cost.

For the purpose of illustration the principles of this invention will be described in connection with a method and apparatus for handling powdered cement, although it will be understood that the invention may be used for other purposes as well.

In the handling of cement, it is common to store the cement in powdered form in a container or silo from which the cement may be discharged as desired from the bottom or sides of the silo, usually either by gravity or pneumatically. The discharge of the cement will often take place at an even rate until the silo is partly emptied, whereupon the discharge will suddenly cease due to the formation of bridges of the powdered cement across the discharge opening, these bridges being formed by cohesion between the particles of cement. When the material is discharged through an opening in the bottom of the silo, it frequently forms firmly packed, funnel-shaped walls flaring upwardly from the discharge opening, whereby continuation of the discharge is prevented. Also, particles of the cement may adhere to the inner surface of the silo walls and other particles cohere to these particles, this action being cumulative until a body of the cement is fixed to the silo walls which is of sufficient size to materially impede the discharge of the cement.

The present invention is directed to the provision of a novel method and apparatus for maintaining powdered cement in a fluid-like condition and for discharging the cement rapidly and continuously as desired.

In accordance with the method of the present invention, the powdered cement is stored in a container, such as a silo, and air entrained in the material is alternately compressed and expanded at a relatively rapid rate, whereby the entrained air is forced back and forth through the particles with a vibratory motion. The entrained air is thus stirred through the particles of cement so that the cement is maintained in a fluid-like condition. Preferably, the rate at which the entrained air is alternately compressed and expanded is such that the particles of cement cannot readily follow the movement of the air currents incident to the expansion and compression of the entrained air, and by so regulating the frequency of the vibratory movement of the entrained air the particles of cement remain substantially stationary during the stirring action. In the preferred method, the alternate compression and expansion of the entrained air is effected by vibrating at least part of the inner surface of the silo walls adjacent the discharge opening, whereby the material near the walls will acquire the properties of a fluid and readily lend itself to discharge. The alternate compression and expansion of the entrained air may be effected continuously as long as material remains in the silo or, alternatively, the compression and expansion of the air may be effected only when some or all of the material is to be discharged. If desired, the entrained air in the material at the mouth of the discharge opening in the silo may be forced back and forth through the material so as to prevent cohesion of the particles at this region.

An apparatus constructed in accordance with the principles of my invention comprises a silo or other container having means therein for forcing the entrained air in the material back and forth through at least part of the material adjacent the walls of the silo at a frequency in excess of that at which the particles of cement can readily follow the air currents. The entrained air may be conveniently forced or stirred through the cement by one or more diaphragms disposed in the silo and adapted to be vibrated by suitable means. Preferably, a vibrating member is also disposed at the mouth of the discharge opening in the silo, the latter member serving to maintain the material near the discharge opening in a fluid-like condition.

For a better understanding of the invention reference may be had to the accompanying drawing in which Fig. 1 is a vertical section through one form of the new apparatus;

Fig. 2 is a section on the line 2—2 of Fig. 1;

Fig. 3 is a detailed view in section of part of the silo wall showing a diaphragm for alternately compressing and expanding the entrained air in the silo; and Fig. 4 is a detailed view partly in section showing a modified form of the diaphragm and the actuating means therefor.

Referring to the drawing, the numeral 10 designates a silo having a circular concrete side wall 11 and a concrete wall 12 tapering downwardly therefrom to a discharge opening 13. The inner surface of the sloping wall 12 of the silo is provided with a plurality of recesses 14 arranged in spaced relation, as shown particularly in Fig. 2. A plate 15 is bolted to the bottom of each recess 14 and is provided with an opening through which a pipe 16 extends, the pipe being provided at its inner end with a sealing member 17. An annular frame 18 of rubber or the like is disposed in each of the recesses 14 over the plate 15 and has a diaphragm 19 mounted on the inner end thereof, preferably flush with the inner surface of the silo wall 12. The annular frame 18 and diaphragm 19 are held in position by means of bolts 20 extending inwardly through the plate, frame and diaphragm, each of the bolts 20 having a nut 21 threaded on the inner end thereof. The diaphragm 19 may be of any suitable material, such as metal, and the plate 15 and diaphragm are held tightly against the annular frame 18 so that the recess 14 is air tight.

Each of the pipes 16 extends outwardly from its corresponding recess 14 through the concrete wall 12 and has a suitable valve 23 therein. The pipes 16 extending from the recesses near the top of the sloping wall 12 lead to a common pipe 24 which, in turn, leads to one end of a cylinder 25. Similarly, the pipes 16 extending outwardly from the recesses 14 near the bottom of the sloping wall 12 are connected to a common pipe 26 which leads to the cylinder 25 through part of pipe 24. Another pipe 27 leads from the common pipe 24 to an expansible and contractible chamber 28 disposed in the discharge opening 13 in the silo. The chamber 28 may be of any desired construction, but is illustrated as a rectangular member having flexible side walls 28'. Valves 29 and 30 are located in the pipes 26 and 27, respectively, whereby the respective chambers to which these pipes lead may be shut off from the common pipe line 24 without affecting the other chambers. Also, a valve 31 is located in the pipe 24 near the chambers 14 so that the latter chambers may be shut off from the cylinder 25 without affecting the chambers supplied by pipes 26 and 27.

A piston 33 is disposed in the cylinder 25 and is adapted to be oscillated therein at a rapid rate by an arm 34 pivoted to the piston at 35. The lower end of the arm 34 is enlarged and is provided with an opening through which an eccentric 35 extends. The eccentric 35 is mounted on a drive shaft 36 which is driven by any suitable means (not shown). The closed system including the chambers 14, expansible and contractible chamber 28, cylinder 25 and the connecting pipes are filled with a suitable fluid, such as air, water or oil. Accordingly when the piston 33 is oscillated in cylinder 25 upon rotation of drive shaft 36, the pressure of the fluid in the closed system will be alternately increased and decreased at a rate depending upon the speed of rotation of drive shaft 36, and this will cause the diaphragm 19 and flexible walls 28' to vibrate at a corresponding frequency.

Upon vibration of the diaphragms 19, the diaphragms will at one moment press the material adjacent thereto against the inner mass of material and at the next moment will move in the opposite direction so as to create a reduction in the pressure of the entrained air in the cement adjacent these members. This reduction in pressure, however, will be released almost immediately by entrained air which is sucked from the contents of the silo near the middle thereof. The diaphragms 19 will then move back in the opposite direction and thereby force the air through the adjacent material toward the interior of the silo. This action will be repeated continuously so that the powdered cement will be mixed and stirred with air, whereby the material near the walls of the silo will acquire the properties of a fluid and will flow or slide in the desired manner when the silo content is to be discharged. The walls 28' of the expansible and contractible chamber 28 will act in a similar manner to maintain the cement near the discharge opening 13 in a fluid-like condition. It will be understood that the frequency at which the members 19 and 28' are vibrated should be sufficiently high so that the particles of cement through which the air is stirred cannot readily follow the air currents incident to the vibration of these members. The valves 23, 29 and 31 may be adjusted so that the diaphragms 19 are operated in any desired combination to obtain the required discharge of cement. Also, the expansible chamber 28 may be rendered inoperative when the cement is not being discharged, by closing the valve 30.

An alternative form of the diaphragms 19 is illustrated in Fig. 4 of the drawing. As there shown, each diaphragm 19' is provided on its inner face with an armature 38 of magnetic material. An electromagnet 39 is mounted on the silo wall 12 adjacent the armature 38 and is adapted to be energized through wiring 40 by a generator 41. The generator 41 is driven by a motor 42 and is adapted to deliver a pulsating current to the electromagnets so that the attractive action of the electromagnet on the armature 38 will alternately increase and decrease rapidly. The diaphragm 19' will thus be vibrated to provide the stirring action in the silo previously referred to. Preferably, the position of the electromagnet 39 relative to the diaphragm is variable by means of an adjusting screw 43 which secures the core of the electromagnet in position. By adjusting the screw, the magnitude of the attractive force exerted by the magnet on the diaphragm may be varied.

It will be observed that the apparatus of the present invention is of a simple construction which may be manufactured at a relatively low cost and is adapted to maintain the powdered material in storage in a fluid-like condition. The diaphragms and the mechanism for vibrating them may be readily installed in a container of any desired form and operate independently of the container. It will be understood that while the diaphragms 19 have been described and illustrated as being mounted in the walls of the container or silo, they may be installed if desired in the container in spaced relation to the walls thereof.

I claim:

1. Apparatus for handling powdered material comprising a container having a discharge opening, an expansible and contractible chamber disposed in the mouth of the opening and spaced on all sides from the surrounding walls of said opening, a fluid-containing system of which said chamber forms a part, a pressure fluid in said system, and means which also forms part of said fluid-containing system for alternately increasing and decreasing the pressure on said fluid to vibrate at least one of the walls of said chamber, said fluid being completely and constantly confined in said system.

2. In a container for powdered material having a wall sloping downwardly to a discharge opening, the combination of a diaphragm disposed in the container adjacent said sloping wall, means for vibrating the diaphragm, and an expansible and contractible chamber disposed in the mouth of said opening and spaced on all sides from the surrounding walls of said opening, a fluid-containing system of which said chamber forms a part, a pressure fluid in said system, and means which also forms part of said fluid-containing system for alternately increasing and decreasing the pressure on said fluid to vibrate at least one of the walls of said chamber, said fluid being completely and constantly confined in said system.

NIELS SOFUS BORCH.